US007171209B2

(12) United States Patent
Numminen et al.

(10) Patent No.: US 7,171,209 B2
(45) Date of Patent: Jan. 30, 2007

(54) SYSTEM AND METHOD FOR ALLOWING SUBSCRIBERS TO MAKE INTERNAL CALLS WHILE ROAMING TO OTHER NETWORKS

(75) Inventors: Raili Numminen, Tampere (FI); Pekka Rissanen, Tampere (FI); Kai Narvanen, Pirkkala (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/812,171

(22) Filed: Mar. 30, 2004

(65) Prior Publication Data
US 2004/0180664 A1    Sep. 16, 2004

Related U.S. Application Data

(63) Continuation of application No. 09/626,023, filed on Jul. 27, 2000, now abandoned.

(30) Foreign Application Priority Data
Jul. 30, 1999    (GB) ................... 9918043.2

(51) Int. Cl.
*H04Q 7/20* (2006.01)

(52) U.S. Cl. ............... 455/445; 455/435.2; 455/432.1; 455/428

(58) Field of Classification Search ........ 455/550–555, 455/432, 433, 435, 403, 405, 406, 411, 414, 455/445, 461–463, 465, 414.1, 414.2, 432.1, 455/435.1; 379/225
See application file for complete search history.

(56) References Cited

U.S. PATENT DOCUMENTS

| | | | |
|---|---|---|---|
| 5,670,950 A | 9/1997 | Otsuka | |
| 5,793,762 A | 8/1998 | Penners et al. | |
| 5,805,976 A | 9/1998 | Frichtel et al. | |
| 5,815,561 A * | 9/1998 | Nguyen et al. | ........ 379/115.01 |
| 6,073,015 A | 6/2000 | Berggren et al. | |
| 6,198,919 B1 | 3/2001 | Buytaert et al. | |
| 6,295,449 B1 * | 9/2001 | Westerlage et al. | ...... 455/422.1 |

(Continued)

FOREIGN PATENT DOCUMENTS

DE    196 30 399    10/1997

(Continued)

*Primary Examiner*—Edan Orgad
(74) *Attorney, Agent, or Firm*—Squire, Sanders & Dempsey, LLP.

(57) ABSTRACT

An access control system for a wireless telecommunications system comprising: a first base station serving a first site and operable as part of a first wireless telecommunications network; a second base station serving a second site and operable as part of a second wireless telecommunications network; the first and second telephone networks being connected together, whereby a call can be connected between the first base station and the second base station via the first wireless telecommunications network and the second wireless telecommunications network; and the access control system comprising: a data link of which use is restricted between the first network and the second network, whereby a call may be connected between the first network and the second network; and a first site link access control unit comprising a database for storing identities of wireless terminals at the second site for permitting calls to such terminals made at the first site to be routed from the first site to the second site over the data link.

29 Claims, 6 Drawing Sheets

U.S. PATENT DOCUMENTS

| | | |
|---|---|---|
| 6,308,067 B1 | 10/2001 | Morgan |
| 6,377,992 B1 | 4/2002 | Plaza Fernández |
| 6,414,939 B1 | 7/2002 | Yamato |
| 2002/0147008 A1 | 10/2002 | Kallio |

FOREIGN PATENT DOCUMENTS

| | | |
|---|---|---|
| WO | WO 97/34437 | 9/1997 |

\* cited by examiner

| MOBILE COUNTRY CODE, MOBILE NETWORK CODE | | GATEWAY WGK ADDRESS |
|---|---|---|
| 244 | 01 | XXX.XXXXX.XXXX |
| 123 | 05 | ZZZ.ZZZZ.ZZZZZZZ |

SYSTEM AND METHOD FOR ALLOWING SUBSCRIBERS TO MAKE INTERNAL CALLS WHILE ROAMING TO OTHER NETWORKS

This application is a continuation of U.S. application Ser. No. 09/626,023, filed Jul. 27, 2000 now abandoned, the entire contents of which are incorporated herein by reference.

FIELD OF THE INVENTION

The present invention relates to a routing in a telecommunications network, for example in a company intranet integrated with a cellular phone system, and in particular to a method for dealing with internal roaming and subscribers wishing to access the intranet from other networks.

BACKGROUND OF THE INVENTION

Prior art office-based communications systems usually operate conventional fixed-line telephone units linked via an internal switchboard or PBX (private branch exchange.) Such fixed-line systems are able to provide relatively high voice quality. However, user mobility is severely impaired. It is also known to connect a base unit for a cordless system such as DECT to the internal PBX. This allows users to use cordless handsets in the office, but the server handsets (unless they are equipped with a dual-mode capability) can not be used outside the local cordless coverage area.

The improvement of digital cellular telephone technologies means that cellular telephone systems can now provide equivalent, if not higher, voice quality than fixed-line systems. Mobile systems also allow greater freedom of movement for the user within the office than do fixed-line systems. However, there can often be difficulties in receiving cellular telephone signals in an office.

RCP (Rich Call Platform) is a proprietary communications system developed by the applicants which introduces the concept of utilising mobile telephone units, such as conventional GSM mobile stations, in an office environment. The system preferably makes use of a known concept called Internet Telephony or Voice-over-IP (Internet Protocol).

Voice-over-IP is a technology which allows sound information to be transmitted over existing IP-based Local or Wide Area Networks or the Internet. In a similar way, data and video information can be encoded so as to be capable of transmission over the same networks. The technology thus provides for convergence and integration of three different media types over the same network.

Prior to the advent of Voice-over-IP, offices often operated three separate networks for the transmission of these media types. As indicated above, fixed-line telephone systems coupled to an in-house PBX provided for voice communication, an office-based LAN or Intranet (i.e. a packet-switched internal network), normally comprising computer terminals linked via network cards and under the control of a server station, provided for the transmission of "conventional" computer data, and video cameras linked to monitors via fixed line or remote transmission link provided for video communication.

Voice-over-IP effectively combines these three media types such that they can be transmitted simultaneously on the same packet-switched intranet network or IP-routed throughout the office environment and, using an external network such as the internet, beyond the confines of the office.

In order to provide for such media convergence, Voice-over-IP often uses a specific ITU (International Telecommunication Union) standard protocol to control the media flow over the Intranet. One common standard protocol used in Voice-over-IP systems, and the one used in the RCP system, is termed H.323.

H.323 is an ITU standard for multimedia communications (voice, video and data) and allows multimedia streaming over conventional packet-switched networks. The protocol provides for call control, multimedia management and bandwidth management for both point-to-point (2 end-users) and multipoint (3 or more end-users) conferences. H.323 also supports standard video and audio codecs (compression/decompression methods such as MPEG) and supports data sharing via the T.120 standard.

Furthermore, H.323 is network, platform and application independent allowing any H.323 compliant terminal to operate in conjunction with any other terminal.

The H.323 standard defines the use of three further command and control protocols:
a) H.245 for call control;
b) Q.931 for call signalling; and
c) The RAS (Registrations, Admissions and Status) signalling function.

The H.245 control channel is responsible for control messages governing the operation of the H.323 terminal including capability exchanges, commands and indications. Q.931 is used to set up a connection between two terminals. RAS governs registration, admission and bandwidth functions between endpoints and Mobile Telephone Servers (defined later).

For an H.323 based communication system, the standard defines four major components:
1. Terminal
2. Gateway
3. Mobile Telephone Server
4. Multipoint Control Unit (MCU)

Terminals are the user end-points on the network, e.g. a telephone or fax unit or a computer terminal. All H.323 compliant terminals must support voice communications, but video and data support is optional.

Gateways connect H.323 networks to other networks or protocols. For an entirely internal communications network i.e. with no external call facility, gateways are not required.

Mobile Telephone Servers are the control centre of the Voice-over-IP network. It is under the control of a Mobile Telephone Server that most transactions (communication between two terminals) are established. Primary functions of the Mobile Telephone Server are address translation, bandwidth management and call control to limit the number of simultaneous H.323 connections and the total bandwidth used by those connections. An H.323 "zone" is defined as the collection of all terminals, gateways and multipoint-control units (MCU-defined below) which are managed by a single Mobile Telephone Server.

Multipoint Control Units (MCU) support communications between three or more terminals. The MCU comprises a multipoint controller (MC) which performs H.245 negotiations between all terminals to determine common audio and video processing capabilities, and a multipoint processor (MP) which routes audio, video and data streams between terminals.

The conventional Voice-over-IP system described herein above normally utilises standard fixed-line telephone systems which are subject to the disadvantages outlined above, namely the lack of mobility and the lack of user commands.

The RCP concept takes Voice-over-IP further in that it provides for the use of conventional mobile telephone units, such as GSM mobile stations, within the Voice-over-IP system. To provide for such mobile communications within an intra-office communication network, RCP combines known Voice-over-IP, as described above, with conventional GSM-based mobile systems.

GSM base stations are provided to give coverage within the office, and are connected to the company's intranet. Intra-office calls to or from cellular telephones in the office are routed through the office intranet and extra-office calls are routed conventionally through the GSM network. Such a system provides most or all of the features supported by the mobile station and the network such as telephone directories, short messaging, multiparty services, data calls, call barring, call forwarding etc. RCP, therefore, provides for integrated voice, video and data communications by interfacing an H.323-based voice-over-IP network with a GSM mobile network.

The RCP system is a cellular network, similar to the conventional GSM network and is divided into H.323 Zones as described above. One H.323 Zone may comprise a number of cells. Two or more H.323 zones may be contained within an administrative domain. The allocation of H.323 zones to an administrative domain is an issue primarily concerning billing and is therefore not relevant to this invention.

A company RCP may be physically located in two or more separate office sites. These sites may reside in two different countries in areas managed by two or more different GSM operators. They may also reside in different regions of a country, in which two different GSM operators would be competing for customers.

It would be desirable to provide a method of allowing subscribers to use the intranet when visiting different sites belonging to the same company and to make calls from their own site to other company sites.

SUMMARY OF THE INVENTION

According to a first aspect of the present invention there is provided an access control system for a wireless telecommunications system comprising: a first base station serving a first site and operable as part of a first wireless telecommunications network; a second base station serving a second site and operable as part of a second wireless telecommunications network; the first and second telephone networks being connected together, whereby a call can be connected between the first base station and the second base station via the first wireless telecommunications network and the second wireless telecommunications network; and the access control system comprising: a data link of which use is restricted between the first network and the second network, whereby a call may be connected between the first network and the second network; and a first site link access control unit comprising a database for storing identities of wireless terminals at the second site for permitting calls to such terminals made at the first site to be routed from the first site to the second site over the data link.

The identities of the wireless terminals suitably each comprise a number identifying a terminal and also a corresponding second site link access control unit address that suitably permits the terminals to be identified as ones whose home data is stored at the second site.

The access control system suitably comprises a database for storing identities of wireless terminals at the first site for permitting calls to such terminals made at the second site to be routed from the second site to the first site over the data link.

According to a second aspect of the present invention there is provided an access control system for a wireless telecommunications system comprising: a first base station and a first site access control unit for storing access information for wireless terminals permitting such terminals to make calls at the first site by means of the first base station, serving a first site and operable as part of a first wireless telecommunications network; a second base station and a second site access control unit for storing access information for wireless terminals permitting such terminals to make calls at the second site by means of the second base station, serving a second site and operable as part of a second wireless telecommunications network; a data link of which use is restricted between the first site access control unit and the second site access control unit, whereby data may be transferred between the first site access control unit and the second site access control unit; the first site access control unit comprising a database for storing information for identifying the identities of wireless terminals whose access information is stored by the second site access control unit, whereby the first site access control unit can access the second site access control unit by means of the data link in order to permit such terminals to make calls at the first site by means of the first base station.

The said database is suitably in the form of a look-up table.

The access information for the wireless terminals may suitably be in the form of an International Mobile Subscriber Identity. This may be the IMSI known from the GSM standard or and equivalent identifier. The access information for the wireless terminals may be in the form of a Temporary Mobile Station Identity Code. This code may enable the first site access control unit to access the International Mobile Station Identity Code.

The access information may be temporarily stored at the first site for enabling the said terminals to make calls at the first site by means of the first base station. Following the said temporary storage of access information, a cancellation procedure may be performed to prevent calls to the said terminals being routed to the second site. The access control unit may be operable to control network access for one or more wireless telecommunications networks.

The access control system is suitably adapted such that if a call made at the first or second site is not made to a wireless terminal of either the first or second site, the call is routed via an external wireless telecommunications network. The external wireless telecommunications network is a GSM network or more generally a network based on the GSM standard. Suitably each such site falls within the coverage area of a different network or different operator. The networks permit roaming of terminals therebetween.

The first base station and the second base station are preferably operable according to the same protocol. The first wireless telecommunications network and the second wireless telecommunications network are preferably operable according to the same protocol. In particular, the air interface specification of the first base station and the second base station and/or the first network and the second network are preferably the same. Thus, a wireless terminal operating in a single mode may be capable of communicating with the first and second base stations, when at the first or second site The first and/or second wireless telecommunications networks may be data networks.

BRIEF DESCRIPTION OF DRAWINGS

The present invention will now be described by way of example with reference to the accompanying drawings, in which.

In the figures, like reference numerals indicate like parts.

DESCRIPTION OF THE PREFERRED EMBODIMENT

Figure 1:
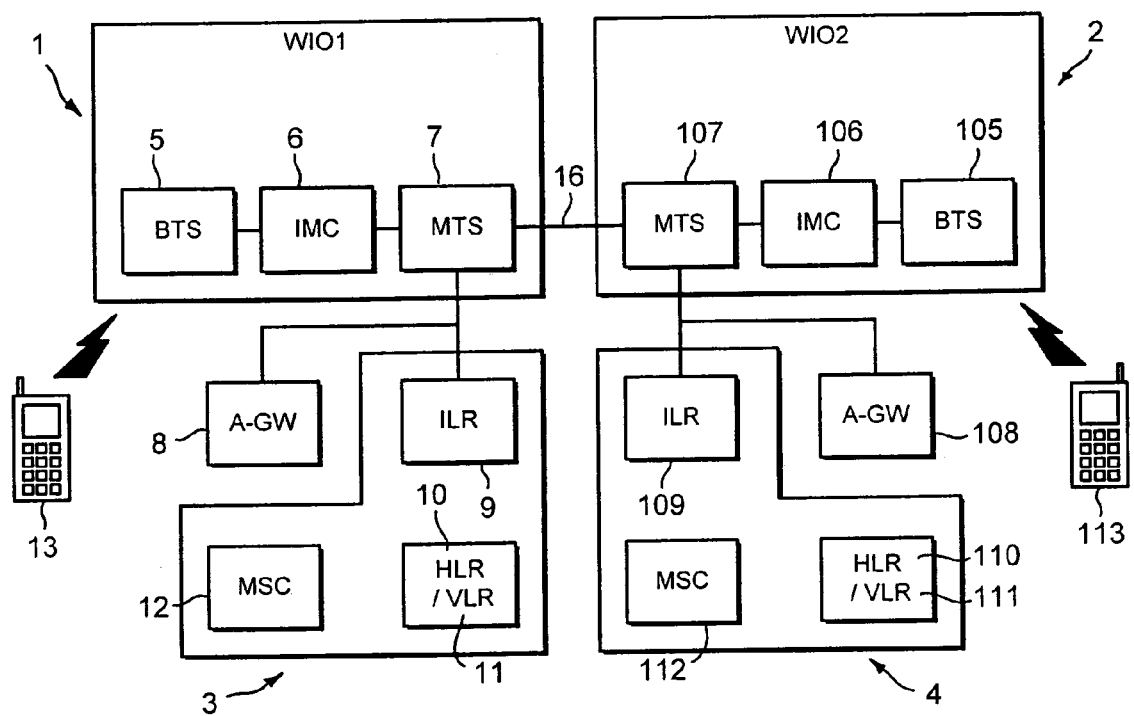
FIG. 1 shows a company RCP physically located at two different geographical sites.

A company's Rich Call Platform telecommunications system may be distributed so as to be physically located in two or more separate office sites of the company. These sites may be in two or more different countries or otherwise in areas managed by two or more different GSM operators. This environment, where there are subscribers in one RCP from two competing network operators, presents problems for supporting internal roaming and calls. FIG. 1 illustrates the environment.

FIG. 1 shows a first corporate office site indicated generally by 1, in which a wireless telephone service is provided by a first wireless telephone operator in a first operator network 3, and a second corporate office site belonging to the same company, indicated generally by 2, in which a wireless telephone service is provided, by a second wireless telephone operator in a second operator network 4. In this example the wireless telephone service is a GSM service, but the service could be provided by other communications systems. Within site 1 there is a Base Transceiver Station (BTS) 5, an Intranet Mobile Cluster (IMC) 6, and a RCP Mobile Telephone Server (MTS) 7. Site 1 is connected to operator network 3 via an A-intranet Gateway 8. Within the operator network 3 there is an Intranet Location Register (ILR) 9, a Home Location Register (HLR) 10, a Visitor Location Register (VLR) 11 and a Mobile Switching Centre (MSC) 12. Each employee (subscriber) of this site has a mobile phone 13. The second office site 2 and the second operator network 4 have equivalent components and these are shown with similar reference numerals. Each employee of this site has a mobile phone 113. There is a direct link 16 between the two sites, the use of which will be explained below. There could be other similar additional sites belonging to the same company which would be linked to sites 1 and 2 by equivalent means.

The BTS is equivalent to a BTS in a standard GSM network and its purpose is to receive and transmit signals to and from mobile phones and to interface with the IMC. The IMC is equivalent to a Base Station Controller in a standard GSM network. Its functions include detection of the possible need for handover, generation of speech and data frames, configuration of the BTS, control of interfacing with the MTS including status enquiry and establishing calls to/from the BTS. The MTS is responsible for controlling access to the intranet, by using information obtained from the ILR 9. The ILR is managed by the home GSM network operator and resides in the home GSM operator premises. It has access to two GSM location registers via a MAP interface, namely the HLR 10 and VLR 11. The HLR and VLR hold all the location information of all subscribers. The HLR is a database which contains all the data concerning the access capabilities of subscribers of the site with which it is associated, and services to which they are entitled. Also the HLR provides MSCs associated with other sites with similar information to allow the subscriber to receive calls whilst visiting another site, for example, site 2. The VLR stores subscriber information for all mobile phones which enter its area of coverage, which allows the MSC to set up calls to and from such phones. When a mobile phone enters its area, the subscriber data is interrogated and can be added to the VLR, so the VLR would contain the address of the subscriber's HLR.

In this environment operators will typically want to manage the local wireless intranet offices (WIOs) and thus have their own ILRs. On the other hand, companies will want to place internal calls between the corporate employees at different RCP sites at minimum cost. For this to be possible, there are two scenarios to be solved.

In the first scenario, an internal call from one RCP office to another residing at a different RCP site, the subscribers belonging to different GSM networks, should be possible. This can be enabled using a corporate owned global directory. The corporate employees are all listed in the directory and an address to their home RCP area can be found from there.

In the second scenario, it should be possible for a corporate employee of site 3 to visit from his/her local office site to site 1 and make internal calls there regardless of the GSM networks of the corporate employees. This situation is termed "roaming". A subscriber from one RCP site may visit another site, which again may be governed by a different network operator. The roaming to the local RCP network can be enabled and internal calls between subscribers of different GSM operators can be allowed. To enable this an Internal Location Update procedure is introduced in addition to the normal location update that will be performed to the GSM network.

These two scenarios will now be described with reference to three possible situations.

Figure 2:
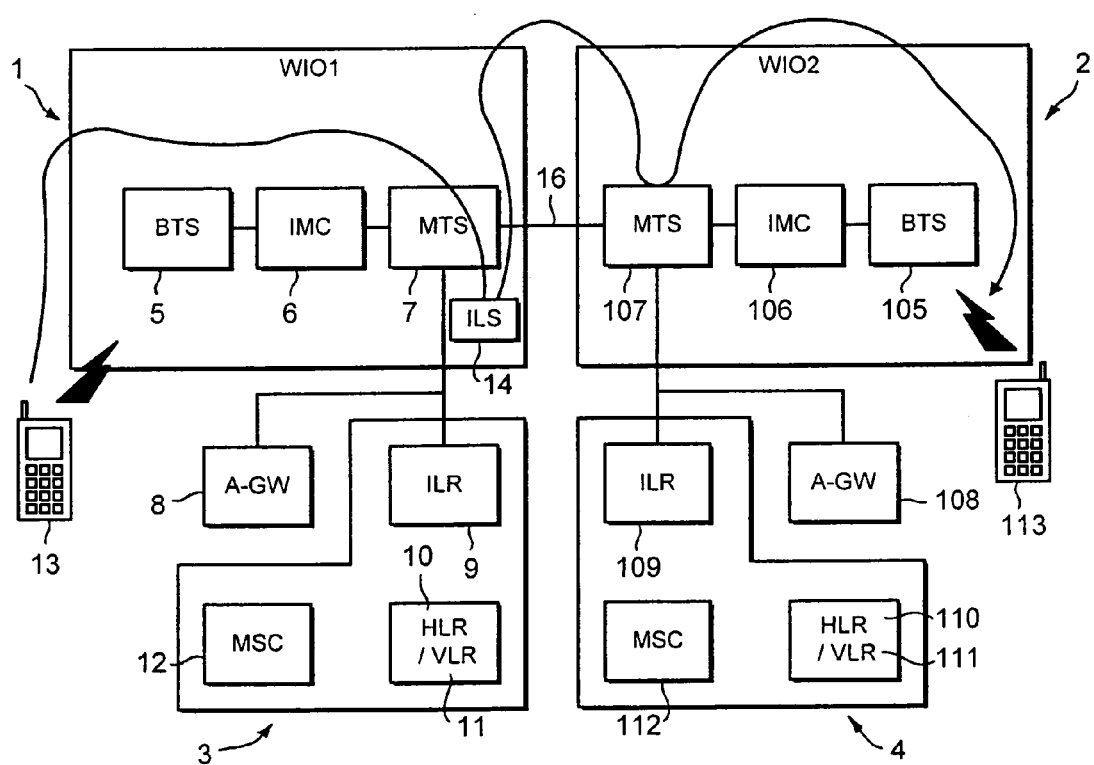
FIG. 2 shows how internal calls between two sites are routed.

The first situation is that of internal calls between two sites, as shown in FIG. 2. The assumption is that the subscribers are not roaming, i.e. they are located at and registered within their own local RCP area, where the respective ILR is directly connected.

This situation occurs when a subscriber of site 1 having a mobile phone 13 wishes to call a second subscriber of site 2 having a mobile phone 113, and both subscribers are located within the base station range of their own home sites. The mobile phone 13 is attached to the BTS 5. When the subscriber makes a call it is routed through the IMC 6 to the MTS 7. The MTS 7 has associated with it an internal database which lists the phone numbers of all subscribers who are currently roaming in the area of site 1, called the local End Point database, to allow them to make internal calls. In this first situation, an extra register is provided, called a Corporate Global Directory. In this embodiment it is stored in the ILS (intranet location server) register 14. This directory is a list of the phone numbers of all employees on all the different sites belonging to the company, site 1 being one of these sites. The list is hierarchical in that it distinguishes between employees of site 1 and employees of other sites. In addition, the local MTS address is stored with the subscriber number. This MTS address identifies the MTS that is directly connected to the ILR in which the called subscriber's subscriber data is stored. In this example the subscriber from site 2 is not roaming.

When the call arrives at the MTS 7, it searches its internal database (the MTS local End Point database) to see whether the called number is listed. If it were, it would then allow the call to be routed internally on the site 1 intranet. In this first case under consideration, the called number belongs to an employee from site 2 whose phone has not yet updated its location, therefore the number is not found on the internal database. Therefore the MTS then checks the Corporate Global Directory, where it will indeed find the number. In this directory, the local (i.e. site 2) MTS address for the called number is listed with the number, hence the call can be directly routed to site 2 via the direct link 16 to MTS 107 and onto mobile 113. The direct link could be an optical cable or other suitable transmission means.

The procedure may be summarised as follows:
1. The MTS searches for the number of the subscriber being called at site 2 from its own database (the "End Point" database)
2. The number is not found, so the MTS searches the number from the Corporate Global Directory
3. The site 2 subscriber is a member of the corporate RCP so the number and MTS address are found
4. The call is routed to the site 2 subscriber's local RCP (site 2) and the MTS 107 there. The subscriber is registered and his data stored in the End Point database of MTS 7.

The advantage of such a system over a situation in which employees' mobile phones attach to external GSM operator base stations is that service quality is likely to be improved because no routing via external GSM networks is required. It would additionally be expected to be less expensive for the company. There would further be increased security for the company because such a direct connection is unlikely to be accessible to the public, though it may be shared by other companies, depending on the type of link.

In the event that the called number is not found on the Corporate Global Directory, the MTS 7 will route the call through the A-internet Gateway 8 to the external GSM network. Thus the direct link 16 is used exclusively for internal calls and is therefore unlikely to incur traffic congestion problems.

The Intranet Location Server is generally used for Net-Meeting address translation purposes. In Rich Call Platform systems the ILS can additionally be used for routing calls between Mobile Telephone Servers that e.g. are physically located in separate office areas i.e. at separate RCP sites. In such a configuration the ILS holds the information of all the workers of the company. When a mobile 13 that locates at a first office at site 1 calls a mobile 113 that locates at a second site 2 of a second office, the ILS is searched and the address of the site 2 Mobile Telephone Server can be found. This address can be used to route the mobile call from site 1 to the site 2 Mobile Telephone Server and further onto mobile 113 in the second office.

The second situation is an example of scenario 2 in which a subscriber from one site is visiting another site and may wish to make a call back to their home site. This means the subscriber is "internally roaming". This situation requires an Internal Location Update, an example being when a corporate RCP member who is normally located at a RCP area abroad visits a local RCP area that is governed by the local GSM network operator.

Each mobile subscriber of the RCP system will be permanently registered in his/her RCP ILR. When the subscriber visits another site within the same RCP, the subscriber data is fetched from the ILR to the visited MTS's local End Point database using the company intranet. The visited MTS address is updated to the ILR register. The subscriber's services are fetched from the ILR 109 and HLR 110 and updated to the MTS's local database. This system is similar to the location update procedure in a GSM network. In the present invention the signalling is done using the company intranet.

Figures 3, 4:
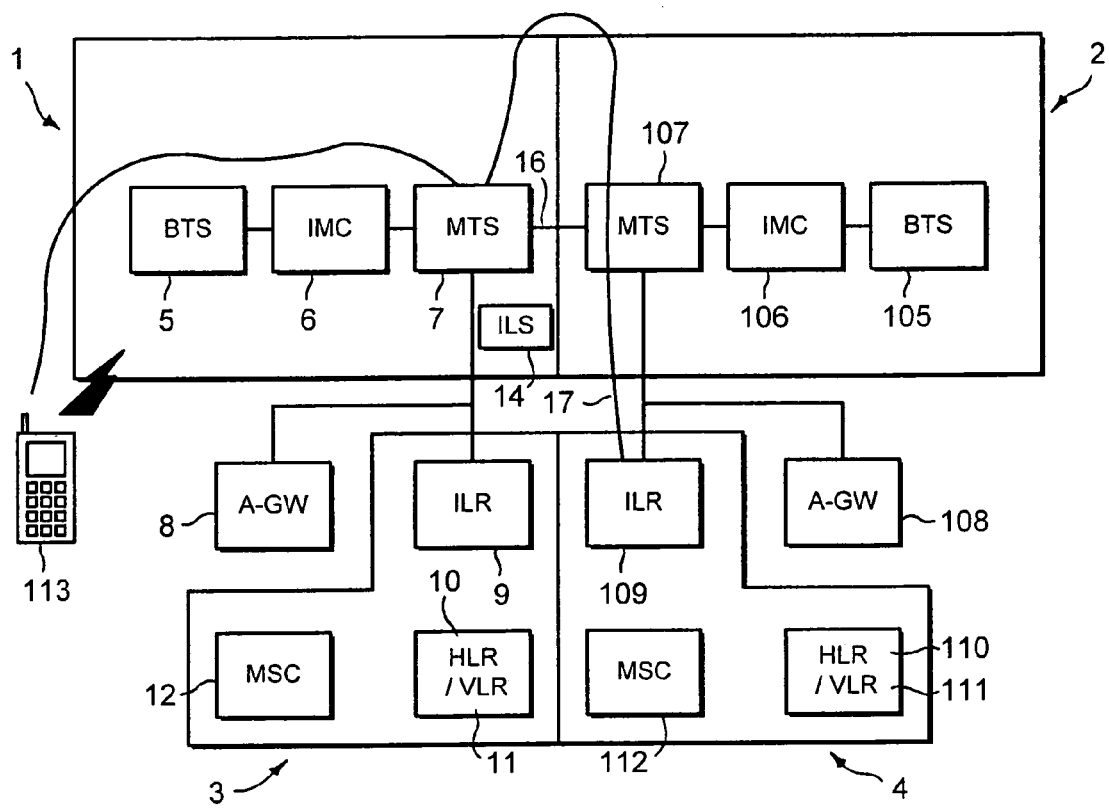
FIG. 3 shows how a call from a subscriber who is visiting another site within the RCP to their own site is routed.
FIG. 4 shows a look-up table for identifying the home address of a subscriber who is visiting another site within the RCP.

A schematic depiction of this situation is shown in FIG. 3, in which a subscriber from site 2, having a mobile phone 113, is visiting site 1 and will wish to make calls to site 2. In this particular case the two sites are in different countries. When the caller (site 2 subscriber) enters the area of site 1, his phone 113 tries to attach to BTS 5. This is called an Internal Location Update (LU) request. The phone does this by presenting its International Mobile Station Identity (IMSI) code or a Temporary Mobile Station Identity (TMSI) code. The IMSI contains information on the country and network area to which the caller belongs.

The IMC 6 routes the request for attachment signal to the MTS 7 which consults its internal database and establishes that the caller is not from site 1. The request is then sent to the ILR 9 within the operator network 3. (If the mobile first identifies itself with a TMSI code, it is possible to convert it to an IMSI code). The ILR 9 thus receives the IMSI code of the caller. It should be-remembered that this ILR is the closest one connected directly to the MTS, not necessarily the same ILR where the subscriber's data is actually stored. Subscriber IMSI information should not be stored in the Corporate Global Directory (in the ILS 14 which is on the company site) because it would be a security risk and because such information is unlikely to be known for sites abroad.

The solution is to have the MTS 7 configured to store an IMSI look-up table. An example of such a table is shown in FIG. 4. Each RCP member has a Mobile Country Code and a Mobile Network (area) Code (as they would in a GSM system), and this information is then used to provide the home MTS address of the member, in this case MTS 107. Once this address has been determined, the MTS 7 can route the LU (location update) to MTS 107 in site 2, from where the request passes to the ILR 109 of the operator network 4 along link 17 as shown in FIG. 3. The ILR 109 informs the MTS 7 as to whether the subscriber is a RCP member or not. If he is, as in this particular case, the ILR 109 returns basic services. Once the MTS receives an answer from the ILR, it can start the location update procedure in the GSM network. In this way, the subscriber data can be retrieved through the internal network to be temporarily stored in MTS end-point-database and the VLR. Once this process has been completed, calls made by this subscriber from site 2 situated temporarily at site 1 having a mobile phone 113 to site 2 are routed directly via the direct link 16. This gives the same advantages as described above for the first situation. Additionally, the normal GSM location update transaction is not delayed much because of the new RCP internal procedure.

The procedure may be summarised as follows:
1. The IMSI is not found from the database on site 1. It is found to be in the area of another GSM network.

2. The MTS re-routes the location update request internally to the other RCP site in the area of the other GSM network using the corporate private intranet.
3. The Internal Location Update request is received by the subscriber's home network ILR. The home network ILR sends subscriber services and updates the visited MTS address to the ILR database.

If the subscriber is not a RCP member, the MTS has an option to reject the location update through the company network.

The MTS 7 in this embodiment is a Special Gateway MTS. This means it is the only connection to other RCPs for the particular GSM network 3 in the particular country in which it is situated. Therefore, other RCPs address this particular MTS for LU requests, and it routes the request to the correct ILR in the correct RCP within the GSM network, possibly via other RCP Mobile Telephone Servers within the particular GSM and RCP network. This feature is not necessary for the process to work between sites 1 and 2 as described above.

Figure 5:
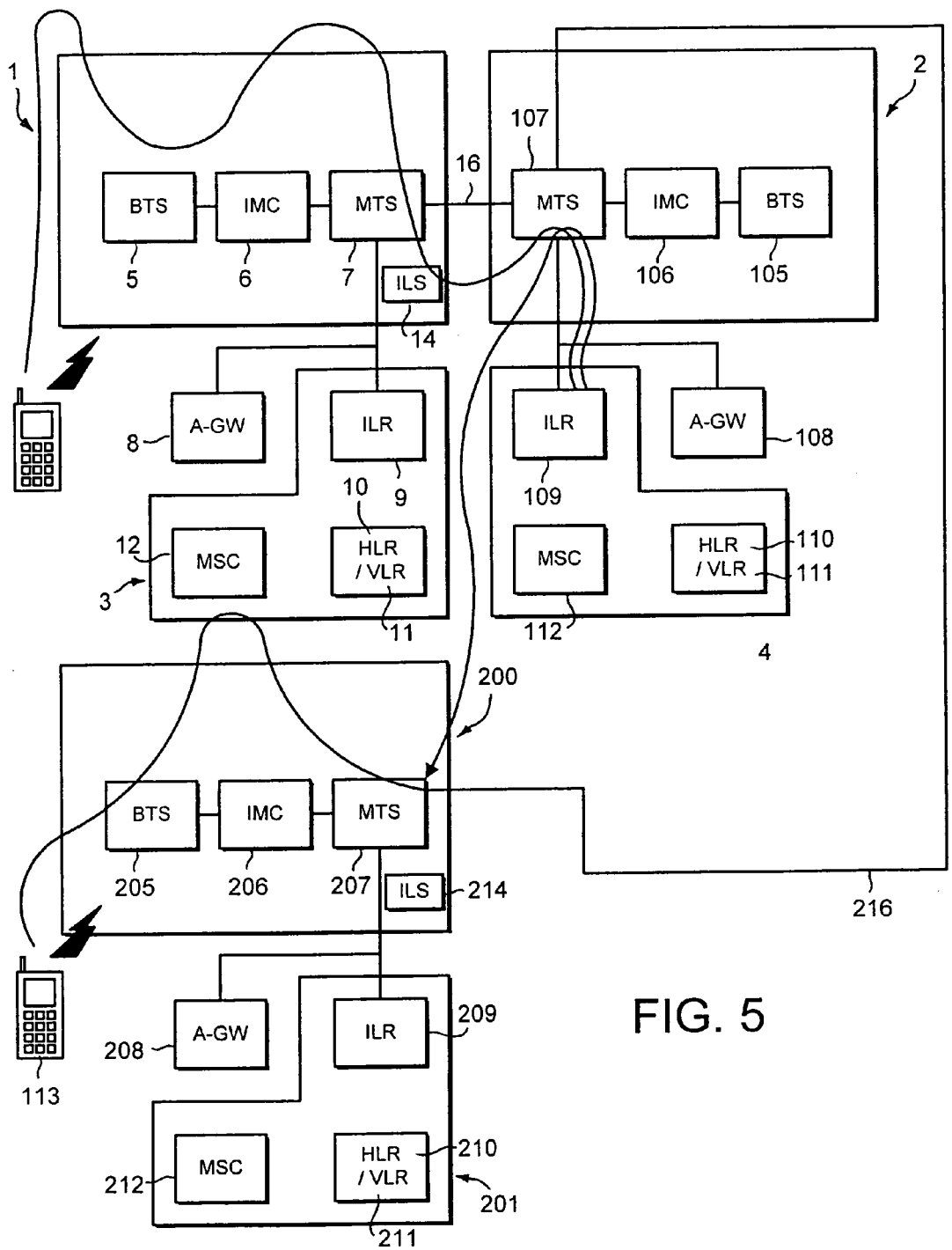
FIG. 5 shows how a call from one subscriber to another subscriber from a different home site who is visiting a third site within the RCP is routed.

The third situation is when a first subscriber from one site is visiting another site and a second subscriber at a third site wishes to ring the first subscriber. This situation is depicted in FIG. 5, in which a subscriber, having a mobile phone 113, from site 2 is visiting site 200 and a subscriber in site 1 from site 1 and having a mobile phone 13 rings him. The subscriber from site 2 will already have made a location update to the office at site 200 which he is visiting, as described above for situation 2. The MTS 7 first searches its own local End Point database to see if the called person is from site 1. In this case the number will not be found, so the MTS 7 then checks the Corporate Global Directory, which in this embodiment is stored in the ILS. This will establish that the called person is a RCP subscriber and, since the "home" MTS address, which in this case is MTS 107, is stored with the subscriber number, will find the "home" MTS address. The "home" ILR has the address of the MTS that the subscriber is currently visiting, that is MTS 207 of site 200. The called person's data will be held in the ILR 209 of the operator network 201 associated with the site 200. Thus the call can be routed directly to the subscriber from site 2 through the RCP via links 16 and 216.

This procedure may be summarised as follows:
1. The MTS searches for the site 2 subscriber's number from its own local database.
2. The number is not found, so the MTS searches the number from the Corporate Global Directory.
3. Since the site 2 subscriber is a member of the corporate RCP so the number and MTS address where the subscriber's ILR is connected to (i.e. at site 200) is found.
4. The call is routed to the home RCP MTS at site 200 but the subscriber is not registered, nor is his subscriber data stored in the MTS database.
5. The Corporate Global Directory is searched and it is found that the subscriber belongs to the area of the local ILR.
6. The subscriber's location MTS address is retrieved from the ILR and the call is routed there.

It will be appreciated by those skilled in the art that variations on the three situations could easily be envisaged for dealing with other similar call situations. In particular the concepts could be extended to work between a large number of corporate sites within a RCP. Furthermore, a combination of the procedures would allow calls to be connected regardless of the direction of the calls being made.

Figure 6:
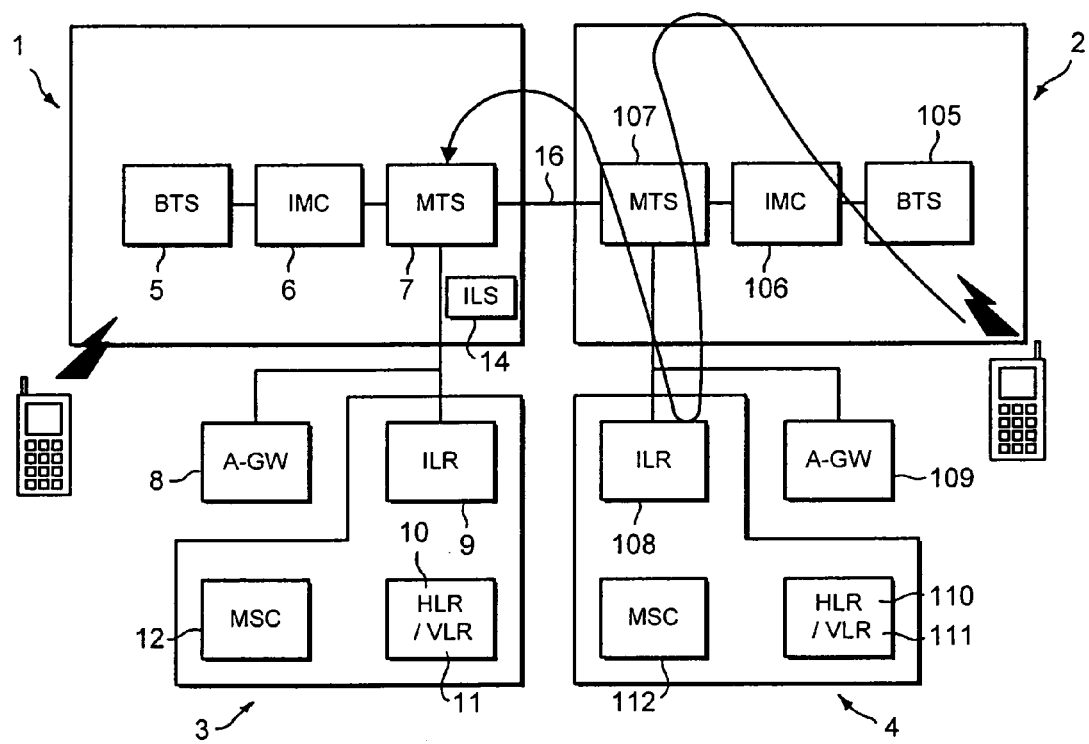
FIG. 6 shows the cancellation of a Location Update request when a subscriber returns to their own site.
Figure 7:
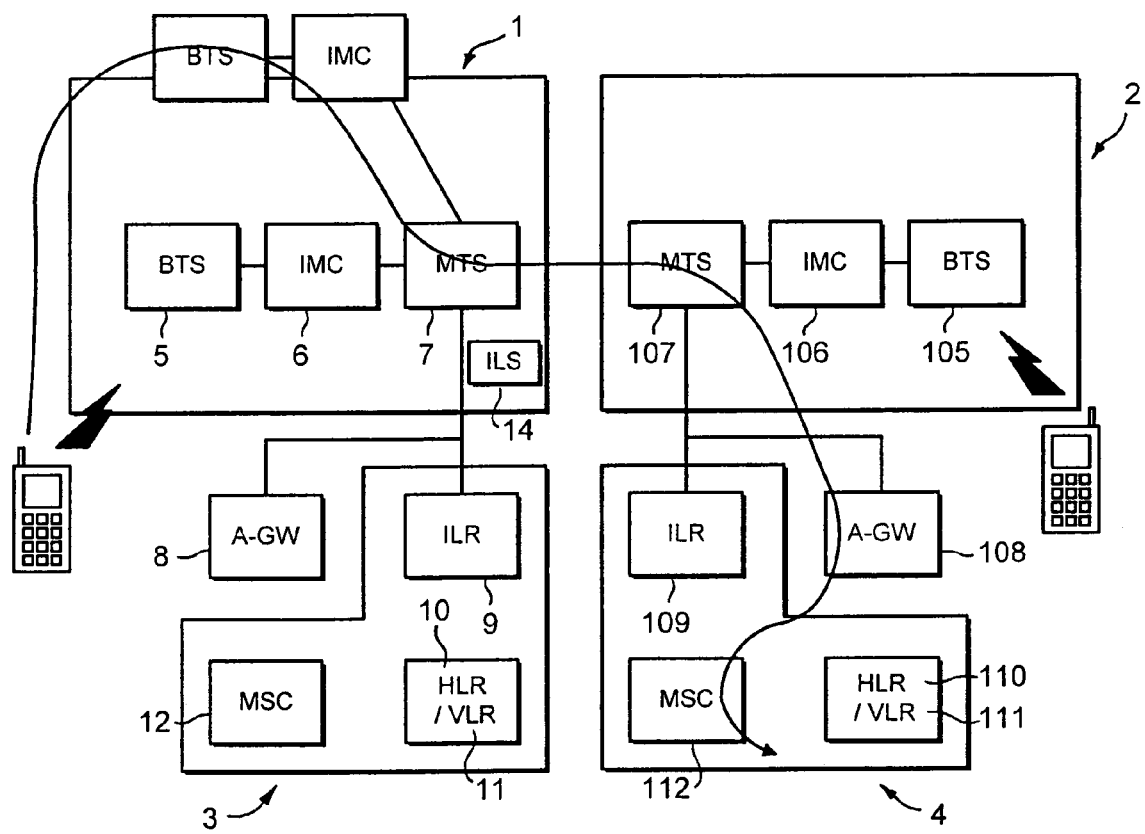
FIG. 7 shows how a call between two subscribers of different home sites within competing GSM networks is routed.

Following an LU procedure involving a roaming subscriber, there is also an Internal Cancel Location procedure which happens automatically when the roaming subscriber's phone requests an LU at the site which he is visiting. The purpose of this is to delete the original subscriber details from the home site MTS End Point Database and delete the original location information from the ILR database so that all calls are routed to and from his temporary location automatically. This means the checking procedure does not have to be performed each time. Similarly, on his return home, an LU will be requested at his home MTS, and then the cancellation procedure to the MTS which he was visiting will be carried out. This process is shown in FIG. 6 and can be summarised as follows:
1. New internal location update request is received.
2. ILR starts Internal Cancel Location to the previous location MTS.

Finally, the interaction between a corporate RCP and GSM networks during a Location Update procedure should be considered. There must not be a situation created in which the mobile subscriber is able to roam internally to a RCP but is not able to roam into any GSM network in the area. This is because RCP outgoing or incoming calls would not be possible in such a situation, and also for security reasons.

Therefore the full location update procedure including both RCP and GSM network location updates must be performed in the following order:
1. If necessary, the TMSI is used to retrieve the subscriber's IMSI from the previous location VLR.
2. The MTS makes an LU request to the subscriber's ILR. If the subscriber is a RCP member, the ILR returns basic services and sends an Internal Cancel Location request to the previous location MTS.
3. A location update is started through the A-intranet Gateway to the GSM network if the location update through the corporate network is rejected.

Only after the MTS has received a positive acknowledgement from the MSC to the location update request, the MTS requests the rest of the subscriber data from the ILR, which in turn retrieves the data from the HLR. If the location update is rejected by the MSC, the MTS must delete the subscriber data and location information from its database and the ILR.

What is claimed is:

1. An access control system for a wireless telecommunications system comprising:
a first base station serving a first site and operable as part of a first wireless telecommunications network;
a second base station serving a second site and operable as part of a second wireless telecommunications network;
the first and second wireless telecommunications networks being connected together and the first and second sites being physically separate, whereby a call can be connected between the first base station and the second base station via the first wireless telecommunications network and the second wireless telecommunications network; and the access control system comprising:
a data link of which use is restricted between the first network and the second network, whereby a call may be connected between the first network and the second network; and
a first site link access control unit comprising a database for storing identities of wireless terminals at the second site for permitting calls to such terminals made at the first site to be routed from the first site to the second site over the data link.

2. An access control system according to claim 1, wherein the identities of the wireless terminals each comprise a number identifying a terminal and a corresponding second site link access control unit address.

3. An access control system according to claim 1, comprising a database for storing identities of wireless terminals at the first site for permitting calls to such terminals made at the second site to be routed from the second site to the first site over the data link.

4. An access control system for a wireless telecommunications system comprising:
   a first base station and a first site access control unit for storing access information for wireless terminals permitting such terminals to make calls at the first site by means of the first base station, serving a first site and operable as part of a first wireless telecommunications network;
   a second base station and a second site access control unit for storing access information for wireless terminals permitting such terminals to make calls at the second site by means of the second base station, serving a second site and operable as part of a second wireless telecommunications network;
   the first and second wireless telecommunications networks being connected together and the first and second sites being physically separate; and
   a data link of which use is restricted between the first site access control unit and the second site access control unit, whereby data may be transferred between the first site access control unit and the second site access control unit; and
   the first site access control unit comprising a database for storing information for identifying the identities of wireless terminals whose access information is stored by the second site access control unit, whereby the first site access control unit can access the second site access control unit by means of the data link in order to permit such terminals to make calls at the first site by means of the first base station and to permit calls to be routed from the first site to the second site over the data link.

5. An access control system according to claim 4, wherein the database is in the form of a look-up table.

6. An access control system according to claim 4, in which the access information for wireless terminals is in the form of an International Mobile Station Identity Code.

7. An access control system according to claim 4, in which the access information for wireless terminals is in the form of a Temporary Mobile Station Identity Code for allowing the first site access control unit to access the International Mobile Station Identity Code.

8. An access control system according to claim 4, in which the access information is temporarily stored at the first site for enabling the said terminals to make calls at the first site by means of the first base station.

9. An access control system according to claim 1, wherein the access control unit is operable to control network access for one or more wireless telecommunications networks.

10. An access control system according to claim 1, wherein if a call made at the first or second site is not made to a wireless terminal of either the first or second site, the call is routed via an external wireless telecommunications network.

11. An access control system according to claim 1, wherein the external wireless telecommunications network is a GSM network.

12. An access control system according to claim 8, wherein following the said temporary storage of access information, a cancellation procedure is performed to prevent calls to the said terminals being routed to the second site.

13. An access control system according to claim 1, in which each site falls within the coverage area of a different GSM network.

14. An access control system as claimed in claim 13, wherein the GSM networks permit roaming of terminals therebetween.

15. A method of controlling access in a wireless telecommunications system, which wireless telecommunications system comprises first and second wireless telecommunications networks connected together and located in physically separate respective first and second sites, the method comprising the steps of:
   storing identities of wireless terminals at the second site in a first site link access control unit;
   using the stored identities to permit a call made at the first site to wireless terminals at the second site to be routed from the first site to the second site over a data link of which use is restricted between the first network and the second network; and
   connecting the said call between the first network and the second network over the data link.

16. A method according to claim 15, wherein the step of connecting the said call comprises the step of connecting the said call between a first base station serving the first site and operable as part of the first wireless telecommunications network and a second base station serving the second site and operable as part of the second wireless telecommunications network, via the first and second wireless telecommunications networks.

17. A method according to claim 15, wherein the identities of the wireless terminals each comprise a number identifying a terminal and a corresponding second site link access control unit address.

18. A method according to claim 15, comprising the further step of storing identities of wireless terminals at the first site for permitting calls to such terminals made at the second site to be routed from the second site to the first site over the data link.

19. A method for controlling access in a wireless telecommunications system which wireless telecommunications system comprises first and second wireless telecommunications networks connected together and located in physically separate respective first and second sites, the method comprising the steps of:
   storing access information for wireless terminals in a first site access control unit serving the first site and operable as part of the first wireless telecommunications network, for permitting wireless terminals to make calls at the first site;
   storing access information for wireless terminals in a second site access control unit serving the second site and operable as part of the second wireless telecommunications network, for permitting wireless terminals to make calls at the second site;
   transferring data between the first site access control unit and the second site access control unit over a data link of which use is restricted between the first site access control unit and the second site access control unit;
   storing in the first site access control unit information for identifying the identities of wireless terminals whose access information has been stored by the second site access control unit; and
   accessing the second site access control unit by means of the data link in order to permit wireless terminals to make internal calls at the first site and to permit calls to be routed from the first site to the second site over the data link.

20. A method according to claim 19, wherein wireless terminals can make calls at the first site by means of a first base station of the first wireless telecommunications network.

21. A method according to claim 19, wherein wireless terminals can make calls at the second site by means of a second base station of the second wireless telecommunications network.

22. A method according to claim 19, wherein the step of storing in the first site access control unit information for identifying the identities of wireless terminals whose access information has been stored by the second site access control unit comprises storing the said information in a database.

23. A method according to claim 22, wherein the database is in the form of a look-up table.

24. A method according to claim 19, wherein the step of storing in the first site access control unit information for identifying the identities of wireless terminals whose access information has been stored by the second site access control unit is carried out temporarily for enabling the said terminals to make calls at the first site.

25. A method according to claim 24, comprising the further step of, following the step of temporarily storing the said information, performing a cancellation procedure to prevent calls to the said terminals being routed to the second site.

26. A method according to claim 15, comprising the further step of, if a call made at the first or second site is not made to a wireless terminal of either the first or second site, routing the call via an external wireless telecommunications network.

27. A method according to claim 26, wherein the external wireless telecommunications network is a GSM network.

28. A method according to claim 15, in which each site falls within the coverage area of a different GSM network.

29. A method as claimed in claim 28, wherein the GSM networks permit roaming of terminals therebetween.

* * * * *